(12) United States Patent
Tao et al.

(10) Patent No.: US 10,740,650 B2
(45) Date of Patent: *Aug. 11, 2020

(54) SYSTEMS AND METHODS FOR NON-CONTACT TRACKING AND ANALYSIS OF EXERCISE

(71) Applicants: Nongjian Tao, Fountain Hills, AZ (US); Yuting Yang, Hangzhou (CN)

(72) Inventors: Nongjian Tao, Fountain Hills, AZ (US); Yuting Yang, Hangzhou (CN)

(73) Assignee: Arizona Board of Regents on Behalf of Arizona State University, Tempe, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/059,904

(22) Filed: Aug. 9, 2018

(65) Prior Publication Data

US 2019/0325257 A1 Oct. 24, 2019

Related U.S. Application Data

(63) Continuation of application No. 14/823,364, filed on Aug. 11, 2015, now Pat. No. 10,078,795.
(Continued)

(51) Int. Cl.
*G06K 9/62* (2006.01)
*G06T 7/20* (2017.01)
*G06K 9/00* (2006.01)

(52) U.S. Cl.
CPC ............ *G06K 9/6202* (2013.01); *G06T 7/20* (2013.01); *G06K 9/00342* (2013.01); *G06T 2207/30196* (2013.01); *G06T 2207/30221* (2013.01)

(58) Field of Classification Search
None
See application file for complete search history.

(56) References Cited

U.S. PATENT DOCUMENTS 7,785,001 B2 8/2010 Tao et al.
8,545,683 B2 10/2013 Tao et al.
(Continued)

FOREIGN PATENT DOCUMENTS

WO 2009064985 A1 5/2009
WO 2010030874 A1 3/2010
(Continued)

OTHER PUBLICATIONS

U.S. Appl. No. 16/134,172, filed Sep. 18, 2018, Forzani et al.
(Continued)

*Primary Examiner* — Tahmina N Ansari
(74) *Attorney, Agent, or Firm* — Polsinelli PC

(57) ABSTRACT

Systems and methods for tracking and analysis physical activity is disclosed. In some aspects, a provided method includes receiving a time sequence of images captured while with an individual is performing the physical activity, and generating, using the time sequence of images, at least one map indicating a movement of the individual. The method also includes identifying at least one body portion using the at least one map, and computing at least one index associated with the identified body portions to characterize the physical activity of the individual. The method further includes generating a report using the at least one index.

23 Claims, 15 Drawing Sheets

Related U.S. Application Data

(60) Provisional application No. 62/035,675, filed on Aug. 11, 2014.

(56) References Cited

U.S. PATENT DOCUMENTS

| | | | |
|---|---|---|---|
| 10,078,074 | B2 | 9/2018 | Tsow et al. |
| 10,143,401 | B2 | 12/2018 | Tao et al. |
| 10,413,226 | B2 | 9/2019 | Tao et al. |
| 2007/0219059 | A1* | 9/2007 | Schwartz ............ A61B 5/0205 482/8 |
| 2011/0251493 | A1* | 10/2011 | Poh ....................... G06K 9/624 600/477 |
| 2014/0267611 | A1* | 9/2014 | Kennett ............. G06K 9/00335 348/46 |
| 2014/0276104 | A1* | 9/2014 | Tao ...................... A61B 5/7239 600/476 |
| 2015/0073283 | A1* | 3/2015 | Van Vugt ............... A61B 5/113 600/476 |
| 2016/0042529 | A1* | 2/2016 | Tao ......................... G06T 7/20 382/107 |
| 2018/0140255 | A1 | 5/2018 | Tao et al. |
| 2019/0082972 | A1 | 3/2019 | Tao et al. |
| 2019/0239761 | A1 | 8/2019 | Tao et al. |
| 2020/0000370 | A1 | 1/2020 | Tao et al. |
| 2020/0022628 | A1 | 1/2020 | Tao et al. |

FOREIGN PATENT DOCUMENTS

| | | |
|---|---|---|
| WO | 2010036940 A2 | 4/2010 |
| WO | 2012164453 A1 | 12/2012 |
| WO | 2013019843 A2 | 2/2013 |
| WO | 2014116604 A1 | 7/2014 |
| WO | 2017156084 A2 | 9/2017 |
| WO | 2018057753 A1 | 3/2018 |
| WO | 2018170009 A1 | 9/2018 |

OTHER PUBLICATIONS

U.S. Appl. No. 16/167,307, filed Oct. 22, 2018, Forzani, et al.

Ainsworth et al., 2011 Compendium of Physical Activities: A Second Update of Codes and MET Values, Medicine and Science in Sports and Exercise, Aug. 2011, 43(8):1575-1581.

As'ari et al., 3D Shape Descriptor for Activities of Daily Living (ADLs) Recognition Based on Kinect-Like Depth Images, Journal of Medical Imaging and Health Informatics, Dec. 2013, 3(4):523-531.

Barris et al., A Review of Vision-Based Motion Analysis in Sport, Sports Medicine, Dec. 2008, 38(12):1025-1043.

Barron et al., Tutorial: Computing 2D and 3D optical flow, Imaging Science and Biomedical Engineering Division, Medical School, University of Manchester, Last Updated Jan. 20, 2005, 12 pages.

Berlin et al., Using activity monitors to measure physical activity in free-living conditions, Physical Therapy, Aug. 2006, 86(8): 1137-1145.

Botton et al., Energy Expenditure During Tennis Play: A Preliminary Video Analysis and Metabolic Model Approach, Journal of Strength and Conditioning Research, Nov. 2011, 25(11):3022-3028.

Bouguet, Pyramidal implementation of the affine lucas kanade feature tracker description of the algorithm, Intel Corporation, 2001, pp. 1-10.

Bray et al., 10-year follow-up of diabetes incidence and weight loss in the Diabetes Prevention Program Outcomes Study, Lancet, Dec. 2009, 374(9702):1677-1686.

Cavagna et al., Mechanical work and efficiency in level walking and running, The Journal of Physiology, Jun. 1977, 268(2):467-481.

Chaaraoui et al., A review on vision techniques applied to Human Behaviour Analysis for Ambient-Assisted Living, Expert Systems with Applications, Sep. 2012, 39(12):10873-10888.

Chitade et al., Colour based image segmentation using k-means clustering, International Journal of Engineering Science and Technology, Oct. 2010, 2(10):5319-5325.

Chuang et al., Fuzzy c-means clustering with spatial information for image segmentation, Computerized Medical Imaging and Graphics, Jan. 2006, 30(1):9-15.

Cotes et al., The energy expenditure and mechanical energy demand in walking, Ergonomics, Apr. 1960, 3(2):97-119.

De Leva, Adjustments to Zatsiorsky-Seluyanov's segment inertia parameters, Journal of Biomechanics, Sep. 1996, 29(9):1223-1230.

Donovan et al., Muscular efficiency during steady-rate exercise. II. Effects of walking speed and work rate, Journal of Applied Physiology, Sep. 1977, 43(3):431-439.

Dow et al., Predictors of Improvement in Cardiometabolic Risk Factors With Weight Loss in Women, Journal of the American Heart Association, Dec. 2013, 2(6):e000152, pp. 1-9.

Edgcomb et al., Estimating daily energy expenditure from video for assistive monitoring, 2013 IEEE International Conference on Healthcare Informatics, 2013, pp. 184-191.

Friedenreich, Physical activity and cancer prevention: From observational to intervention research, Cancer Epidemiology, Biomarkers and Prevention, Apr. 2001, 10(4):287-301.

Fukuoka et al., Innovation to motivation-pilot study of a mobile phone intervention to increase physical activity among sedentary women, Preventive Medicine, 2010, 51(3-4): 287-289.

Gaesser et al., Muscular efficiency during steady-rate exercise: effects of speed and work rate, Journal of Applied Physiology, Jun. 1975, 38(6):1132-1139.

Gray et al., Fitness, dietary intake, and body mass index in urban Native American youth, Journal of the American Dietetic Association, 2003, 103(9):1187-1191.

Hardman et al., Effects of rewards, peer-modelling and pedometer targets on children's physical activity: A school-based intervention study, Psychology & Health, Jan. 2011, 26(1):3-21.

Hemmingsson et al., Is the association between physical activity and body mass index obesity dependent?, International Journal of Obesity, Apr. 2007, 31(4):663-668.

Henry et al., New options for the treatment of obesity and type 2 diabetes mellitus (narrative review), Journal of Diabetes and Its Complications, Sep. 2013, 27(5):508-518.

Hollander et al., Effects of Taspoglutide on Glycemic Control and Body Weight in Obese Patients With Type 2 Diabetes (T-Emerge 7 Study), Obesity, Feb. 2013, 21(2):238-247.

Holte et al., Human Pose Estimation and Activity Recognition From Multi-View Videos: Comparative Explorations of Recent Developments, IEEE Journal of Selected Topics in Signal Processing, Sep. 2012, 6(5):538-552.

Jacobs et al., Wii health: a preliminary study of the health and wellness benefits of Wii Fit on university students, British Journal of Occupational Therapy, Jun. 2011, 74(6): p. 262-268.

John et al., Calibrating a novel multi-sensor physical activity measurement system, Physiol Meas., Sep. 2011, 32(9):1473-1489.

Kim et al., ViziCal: accurate energy expenditure prediction for playing exergames, in Proceedings of the 26th annual ACM symposium on User interface software and technology, 2013, ACM: St. Andrews, Scotland, United Kingdom, 397-404.

Kozey et al., Accelerometer Output and MET Values of Common Physical Activities, Medicine and Science in Sports and Exercise, Sep. 2010, 42(9):1776-1784.

Lee et al., The effect of an intervention combining self-efficacy theory and pedometers on promoting physical activity among adolescents, Journal of Clinical Nursing, Apr. 2012, 21(7-8)914-922.

Livingstone et al., Measurement of dietary intake in children, Proceedings of the Nutrition Society, May 2000, 59(2):279-293.

Masoud et al., A method for human action recognition, Image and Vision Computing, Aug. 2003, 21(8):729-743.

Matthews et al., Amount of time spent in sedentary behaviors in the United States, 2003-2004, Am J Epidemiol., Apr. 2008, 167(7):875-881.

Nam et al., Physical Activity Recognition using Multiple Sensors Embedded in a Wearable Device, ACM Transactions on Embedded Computing Systems, Feb. 2013, vol. 12, No. 2, Article 26, pp. 1-14.

(56) References Cited

OTHER PUBLICATIONS

Osgnach et al., Energy cost and metabolic power in elite soccer: a new match analysis approach, Medicine & Science in Sports & Exercise, Jan. 2010, 42(1):170-178.
Petersen et al., Economic costs of diabetes in the U.S. in 2007, Diabetes Care, Mar. 2008, 31(3):596-615.
Shaw et al., 'Pedometers cost buttons': the feasibility of implementing a pedometer based walking programme within the community, BMC Public Health, 2011, 11(1):200, 9 pages.
Sulaiman et al., Adaptive Fuzzy-K-means Clustering Algorithm for Image Segmentation, IEEE Transactions on Consumer Electronics, 2010, 56(4):2661-2668.
Tarassenko, Lionel, "One Techonology. Three Vital Signs. Unlimited Possibilities." Dec. 21, 2013, pp. 1-3, Internet page off Oxehealth.com website; web address: https://web.archive.org/web/20131221174637/http://www.oxehealth.com/.
Taren et al., The association of energy intake bias with psychological scores of women, European Journal of Clinical Nutrition, 1999, 53(7):570-578.
Troiano et al., Promises and Pitfalls of Emerging Measures of Physical Activity and the Environment, American Journal of Preventive Medicine, Jun. 2010, 38(6):682-683.
Williams et al., The relationship between mechanical and physiological energy estimates, Medicine and Science in Sports and Exercise, 1985, 17(3):317-325.
Zacks, The mechanical efficiencies of running and bicycling against a horizontal impeding force, European Journal of Applied Physiology and Occupational Physiology, Dec. 1973, 31(4):249-258.
Zhang et al., Physical activity recognition based on motion in images acquired by a wearable camera, Neurocomputing, Jun. 2011, 74(12-13):2184-2192.
Zhou et al., Activity Analysis, Summarization, and Visualization for Indoor Human Activity Monitoring, IEEE Transactions on Circuits and Systems for Video Technology, Nov. 2008, 18(11):1489-1498.
Zhu et al., Motion- and location-based online human daily activity recognition, Pervasive and Mobile Computing, Apr. 2011, 7(2):256-269.

\* cited by examiner

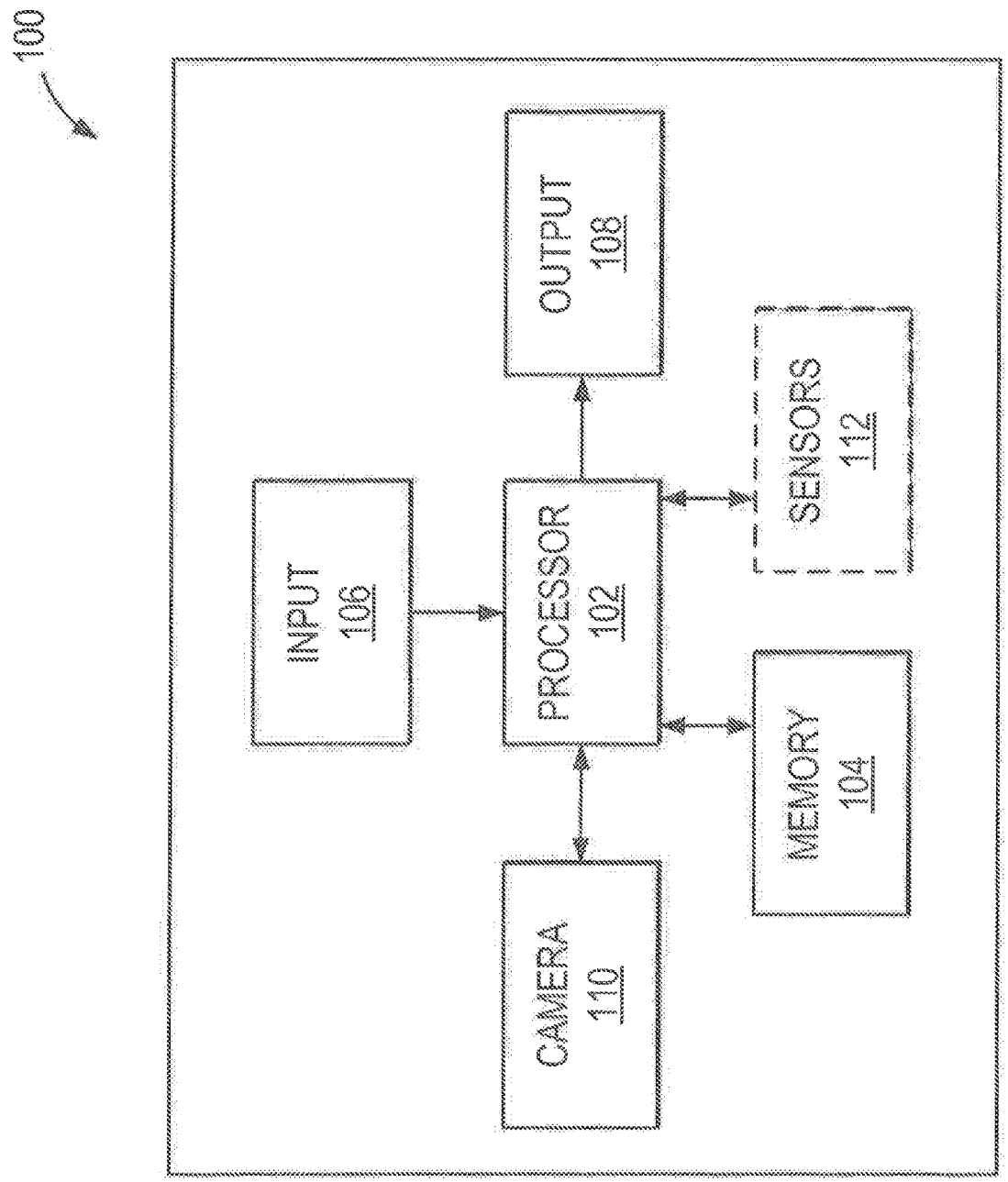

Contour of histogram

The sum of squared difference (SSD). The SSD sign is reversed and normalized to range [0 1].

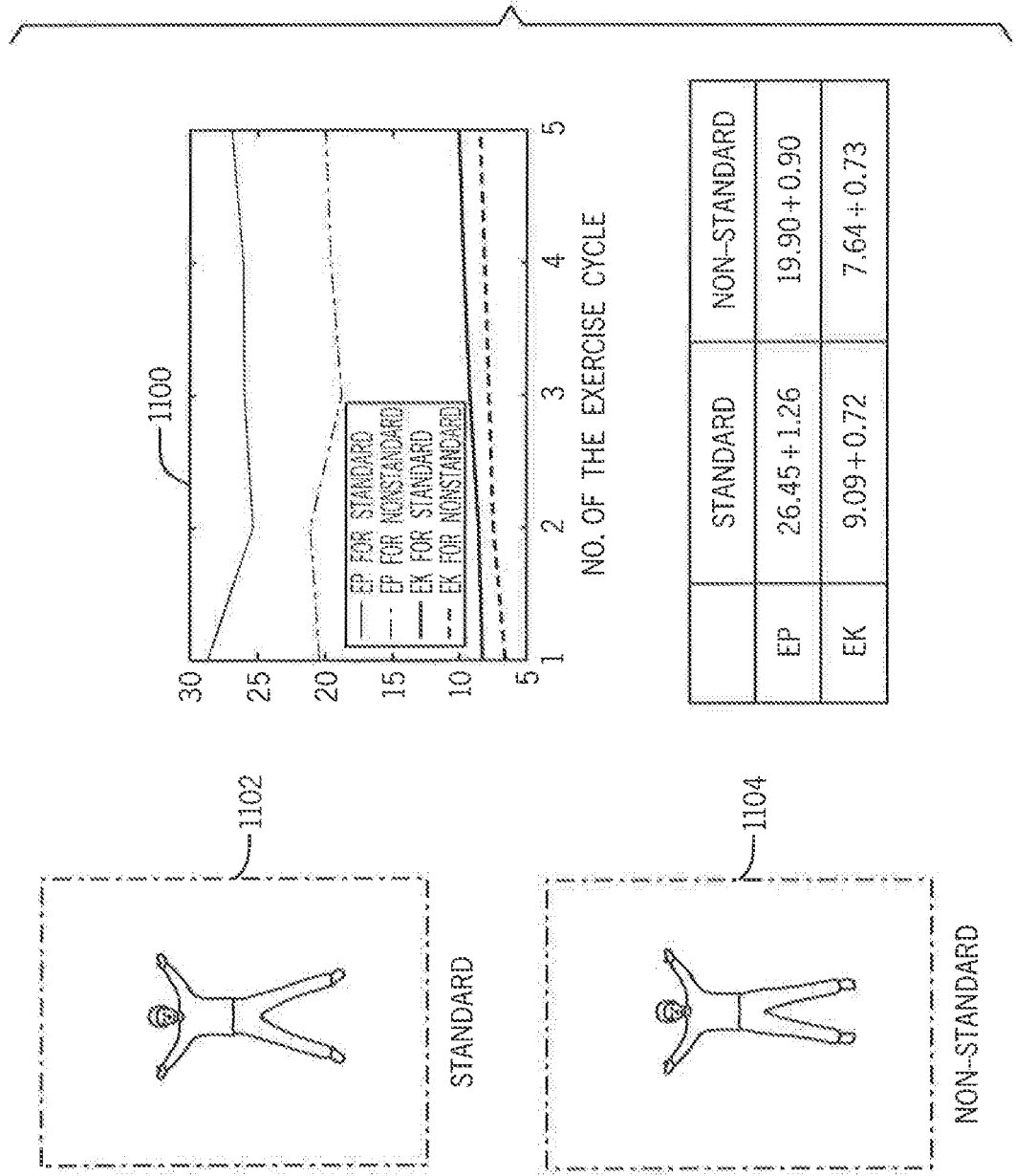

SYSTEMS AND METHODS FOR NON-CONTACT TRACKING AND ANALYSIS OF EXERCISE

CROSS-REFERENCE TO RELATED APPLICATIONS

This application is a continuation of U.S. patent application Ser. No. 14/823,364, filed on Aug. 11, 2015, which is based on, claims priority to, and incorporates herein by reference in its entirety U.S. Provisional Application Ser. No. 62/035,675, filed Aug. 11, 2014, and entitled "SYSTEM AND METHOD FOR NON-CONTACT TRACKING AND ANALYSIS OF EXERCISE."

BACKGROUND OF THE DISCLOSURE

The field of the invention is monitoring movement of an individual. More particularly, the invention relates to obtaining and analyzing data of exercises of an individual using non-contacting equipment.

The importance of physical activity is widely accepted, with overwhelming evidence pointing to the fact that regular exercise can help lower excess weight, reduce disease risks, and improve overall health. With increasingly sedentary lifestyles, maintaining regular workouts continues to be a challenge for many people. As a result, a number of tools and devices have been developed in recent years to quantify and track personal activities. Such devices can be used to motivate individuals to adhere to specific workout regimens, as well as provide valuable information to health and fitness professionals to identify the most beneficial course of action. In addition, such tools can enable study of the impact of specific activities on disease.

Assessment of physical activity has been traditionally based on self-reporting, and more recently on portable or wearable electronic devices. With self-reporting, various databases listing activity information obtained from population studies have been used to estimate energy expenditure during particular exercises. This approach is burdensome, subjective and prone to human error. With the advent of smartphones and other personal devices, personalized tracking of physical activity has become easier. Although such portable or wearable devices, fitted with a number of physical sensors, such as accelerometers and GPS trackers, offer distinct advantages in estimating physical activity level compared to self-reporting, they also have drawbacks.

Specifically, GPS tracking methods are limited to certain outdoor activities, such as running, cycling or hiking. On the other hand, accelerometer-based tracking methods are sensitive to how they are utilized, for instance, whether carried in a pocket or worn on an arm. They also require accurate algorithms for determining true energy expenditure, and differentiating non-exercise induced movements, such as driving or riding a bus. More importantly, many of the above-mentioned technologies cannot be applied to many common physical activities, including popular workouts (e.g., push up, yoga and weight lifting), as well as housework activities, and so forth. In addition, most wearable devices determine complex human body movements based on measurement with a single sensor at a particular location of the body (e.g., wrist), which can result in a number of false readings. Moreover, a device worn on a wrist, for example, cannot distinguish between bicep training and say eating a potato chip, since both activities involve similar arm movement.

As an alternative to wearable devices, imaging-based systems, relying on radio waves and optical imaging, have been developed to provide information for determining energy use during physical activity. Although these systems rely on sensors not directly in contact with an individual, in order to accurately track body movement, special markers placed at strategic locations, such as joints, must be worn. This makes use of imaging-based systems inconvenient for most people. In addition, such technologies have focused primarily on physical activities involving large center-of-mass movements, such as walking or running. By contrast, many common indoor workout routines, including push-ups, sit-ups, jumping jacks, and squats, involve small or subtle body movements (e.g., arms, legs and head), and also often upward movements against gravity, which are hard to track. Therefore, optical imaging-based activity trackers are not typically used for tracking exercise.

In light of the above, there is a need for improved systems and methods to accurately measure various characteristics associated with common physical activities, such as exercise.

SUMMARY OF THE DISCLOSURE

The present disclosure overcomes the aforementioned drawbacks by providing non-contacting systems and methods for monitoring an individual. In particular, a novel approach is described for quantifying the movement of the individual during various physical activities using image information. In this manner, effort, intensity, repetition count, duration, energy expenditure, and other parameters associated with the activity can be determined without need for direct contact with the individual. In some aspects, additional vital sign tracking, such as heart rate and breathing frequency and volume, may also be integrated in systems and methods described herein.

In one aspect of the present disclosure, a system for analyzing a physical activity of an individual without contacting the individual is provided. The system includes an apparatus configured to capture a time sequence of images of an individual performing a physical activity, and a processor configured to receive the captured time sequence of images, and generate, using the time sequence of images, at least one map indicating movement of the individual. The processor is also configured to identify at least one body portion of the individual using the at least one map, and compute at least one index associated with the at least one identified body portion to characterize the physical activity. The processor is further configured to generate a report using the at least one index.

In another aspect of the present disclosure, a method for analyzing a physical activity of an individual without contacting the individual is provided. The method includes receiving a time sequence of images captured while with an individual is performing the physical activity, and generating, using the time sequence of images, at least one map indicating a movement of the individual. The method also includes identifying at least one body portion using the at least one map, and computing at least one index associated with the identified body portions to characterize the physical activity of the individual. The method further includes generating a report using the at least one index.

The foregoing and other aspects and advantages of the invention will appear from the following description. In the description, reference is made to the accompanying drawings that form a part hereof, and in which there is shown by way of illustration a preferred embodiment of the invention.

Such embodiment does not necessarily represent the full scope of the invention, however, and reference is made therefore to the claims and herein for interpreting the scope of the invention.

BRIEF DESCRIPTION OF THE DRAWINGS

FIG. 1A is a schematic diagram of an example system in accordance with aspects of the present disclosure.

FIG. 11 shows a weighted kinetic and potential energy analysis of a jumping jack in accordance with the present disclosure.

DETAILED DESCRIPTION

Figure 1B:
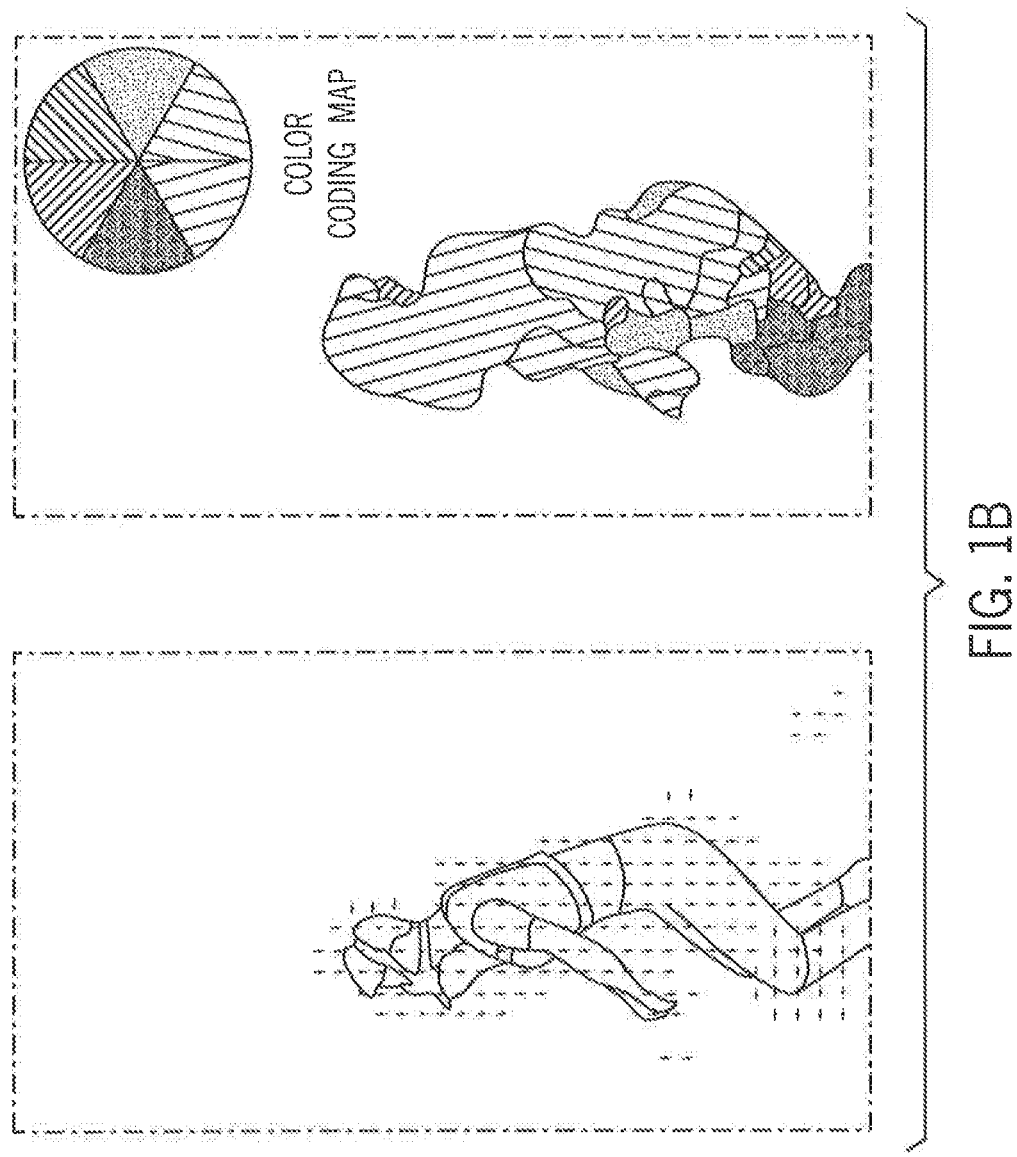
FIG. 1B are images showing an example velocity fields generated using methods of the present disclosure.

The present disclosure provides systems and methods directed to a non-contacting approach for assessing exercise, and other physical activities. Specifically, methods described are based on processing images, and other data, acquired from an individual to objectively quantify physical activity. As will be described, an optical flow approach may be utilized to analyze body movement to determine various indices associated with exercise, including activity intensity and energy expenditure. In some aspects, a hierarchical kinematic approach may be implemented to analyze body movement using various degrees of detail, reflecting particular body parts or body regions, or layers, as referred to herein. For example, a first layer may be associated with an overall body movement, namely a center of mass, while a second layer may include the head, trunk, legs and arms of the body. A third layer may reflect body portions thereof, and so forth, based on need and/or available image quality, as well as other factors.

In some aspects, velocity as well as displacement, such as vertical displacement, of different body portions may be analyzed during one or more physical activities. Specifically, velocity is related to kinetic energy, while vertical displacement is associated with potential energy. As may be appreciated, this approach accounts for importance of gravity. In particular, vertical displacement is especially important for many popular indoor workouts, which sometimes involve carrying additional weight. The intensity of a physical activity may then be quantified using the various weightings of contributions from such potential and kinetic terms from different body parts or portions thereof. In some implementations, systems and methods provided herein may be utilized to automatically identify and characterize a particular physical activity, using measures, as described.

Although the present disclosure, describes the present systems and methods with reference to specific implementations, it may readily be recognized that this approach may be extended to a variety of applications. For example, rather than analyzing exercise, the provided systems and methods may also be utilized to determine a worker efficiency, a stress level, an activity accuracy or a likelihood for fatigue. In addition, systems and methods herein may also be combined with measurements physiological parameters, such as heart rate, stress, breathing rate, blood oxygen saturation, and so forth, providing an indication of a level of fitness or health.

Turning now to FIG. 1, a block diagram of a system 100 for use in identifying and characterizing physical activities is shown. In general, the system 100 may be any device, apparatus or system configured for carrying out instructions in accordance with the present disclosure. System 100 may operate independently or as part of, or in collaboration with, a computer, system, device, machine, mainframe, or server. In some aspects, the system 100 may be portable, such as a mobile device, smartphone, tablet, laptop, or other portable or wearable device or apparatus, and can be connected to the internet physically or wirelessly. In this regard, the system 100 may be any system that is designed to integrate with a variety of software and hardware capabilities and functionalities, and may be capable of operating autonomously and/or with instruction from a user or other system or device. In accordance with the present disclosure, system 100 may be configured to identify and characterize a physical activity performed by an individual without contacting the individual. As such, system 100 may be preferably positioned away from the individual, although certain portions of the system 100 could remain in contact with the individual.

In general, the system 100 may include a processor 102, a memory 104, an input 106, an output 108, a camera 110, or similar image or video recording device or apparatus, and optionally other physiological sensors 112. In particular, the input 106 may be configured to receive a variety of information from a user, a server, a database, and so forth, via a wired or wireless connection. For example, the input 106 may be in the form of one or more touch screen, button, keyboard, mouse, and the like, as well as a compact disc, a flash-drive or other computer-readable medium. In some aspects, the input 106 may also include a microphone or other sensor.

In addition to being configured to carry out steps for operating the system 100 using instructions stored in the memory 104, the processor 102 may be configured to identify and/or characterize a physical activity of an individual, in accordance with the present disclosure. Specifically, the processor 102 may be configured to process imaging, and other data, obtained using the camera 110, received via input 106, or retrieved from the memory 104 or other storage location. The processor 102 may also be configured to perform computations and analyses using information provided by a user, for example, in the form of audio signals or commands, and/or inputted operations, as well as user profile information.

In some aspects, the processor 102 may be configured to analyze a time sequence of images acquired while an individual is performing a physical activity or exercise. In particular, an analysis may be performed by the processor 102 to generate maps indicative movement of the individual, both in amplitude and direction, as shown in the examples of FIG. 1B. For example, an optical flow sensing algorithm may be applied the time sequence of images to create one or more velocity fields of the individual's body. Such velocity fields may be utilized to identify various body parts, or portions thereof, by grouping adjacent pixels in respective maps with similar movement together, since different body portions perform similar movement both in direction and amplitude. By way of example, different body parts can include the head of the individual, the neck, the trunk, the upper, the lower arms, the hands, the upper legs, the lower legs, and feet, as well as combinations thereof. Therefore pixels associated with the same body parts are highly correlated and may be grouped together. Alternative approaches to segment different body portions can include k-means clustering algorithms and their variants. Also, in identifying the different body portions, additional information may also be provided, including personal profile information, type of activity, as well as the type and texture of clothing worn, and so forth. The processor 102 may also be configured to performed a number of other processing steps, including image processing steps.

In analyzing imaging and other data, the processor 102 may be configured to compute various quantities associated with the identified body portions. In particular, the processor 102 is configured to determine the velocity, both direction and amplitude, for the identified body parts, or portions thereof, as well as respective displacement amplitudes. In some aspects, vertical displacements for the different body portions are determined. Values for velocities or displacements for each body portion may be determined by averaging pixel values associated with the body portion.

The processor 102 may then compute a number of indices associated with the identified body portions. For example, the processor 102 may also include energy expenditure for the identified body portions. Also, the processor 102 may compute an intensity index using a weighted sum of the vertical displacement and a weighted sum of the square of the velocity for each or all identified body portions. The weighting factors may be approximated or determined based on independent measurements, as well as other provided information associated with the individual. For example, weighting factors may depend on relative mass of the individual body portions, gender of the individual, type of physical activity, and so forth. Weight factors may also take into account internal or external energy dissipation, such as joint friction, or air resistance, as well as metabolic efficiency of converting chemical energy to mechanical movement. In some aspects, a repetition rate may also be determined by the processor 102 using the identified displacements or an identified boundary of one or more body portion. In other implementations, the processor 102 may count the repetitions using a template matching of an oriented histogram of the optical flow field. As described, the processor 102 may compute various indices for a number of layers with increasing level of detail.

The processor 102 may also characterize a physical activity or exercise performed by the individual. For instance, in some aspects, the processor 102 may utilize computed indices to identify an intensity and/or energy expenditure associated with the physical activity. In some aspects, the processor 102 may also identify a type of activity performed by the individual. As mentioned, the processor 102 may further analyze or correlate computed indices, and other information determined therefrom, with measurements physiological parameters, such as heart rate, stress, breathing rate, blood oxygen saturation, and so forth, to characterize the physical activity, including determining an efficiency, a stress level, an activity accuracy or a likelihood for fatigue.

Figure 1C:
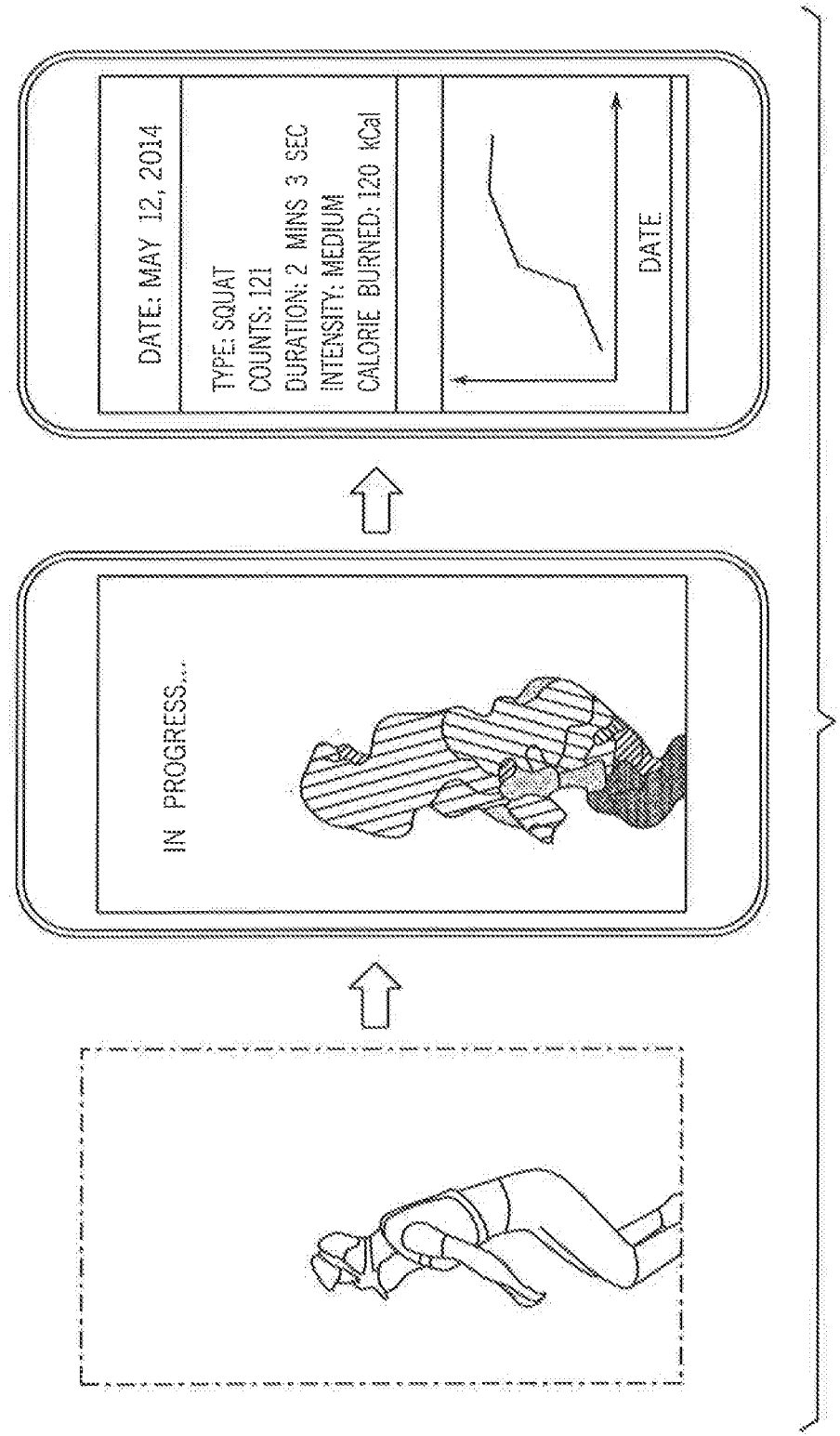
FIG. 1C is example output for a smartphone utilizing methods in accordance with the present disclosure.

Information and data processed by the processor 102 may then be relayed to the output 108 as a report. Such report may be in any form and include any audio or visual information associated with the analyzed physical activity, including computed indices. For instance, the report may include an intensity, energy expenditure, activity duration, repetition count, and so forth, for a selected or identified physical activity. By way of example, FIG. 1C shows possible outputs displayed on a smartphone. In some aspects, the report may also include information associated with a fitness goal progress or a health condition, as well as instructions to a user regarding the physical activity.

Figure 1D:
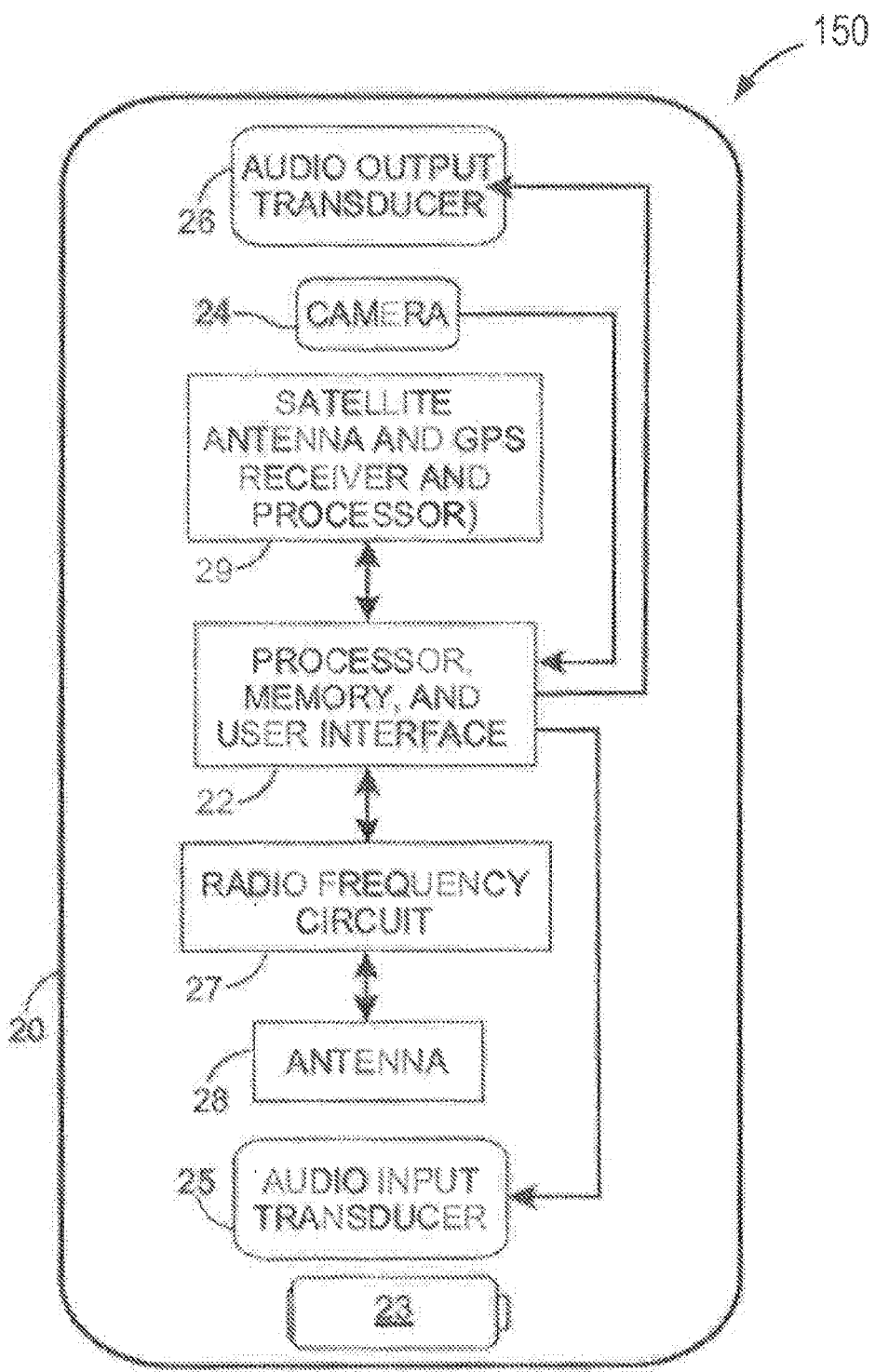
FIG. 1D is a schematic diagram of an example video recording device for analyzing exercise in accordance with the present disclosure.

Referring to FIG. 1D, a video recording device 150, in accordance with aspects of the present disclosure, illustratively comprises a housing 20 that encloses the circuitry and other components of the device 150. Those components include a primary circuit 22 that includes a microcomputer based processor, one or more memory devices, along with a user interface comprising a display, a keyboard, and/or touch screen. A camera 24 acts as a sensor for the video recording device 150. An audio input transducer 25, such as a microphone, and an audio output transducer 26, such as a speaker, function as an audio interface to the user and are connected to the primary circuitry 22. Communication functions are performed through a radio frequency transceiver 28 which includes a wireless signal receiver and a wireless signal transmitter that are connected to an antenna assembly 27. The video recording device 150 may include a satellite positioning system (e.g., GPS, Galileo, etc.) receiver and antenna to provide position locating capabilities, as will be appreciated by those skilled in the art. Other auxiliary devices, such as for example, a WLAN (e.g., Bluetooth®, IEEE. 802.11) antenna and circuits for WLAN communication capabilities, also may be provided. A battery 23 is carried within the housing 20 to supply power to the internal circuitry and components. In some aspects, the primary circuit 22 including the processor may be configured to operate to track and measure the vertical movement (or other directional movement) and the velocity (and/or acceleration) of the individual during movement using feedback from the camera 24.

Figure 2A:
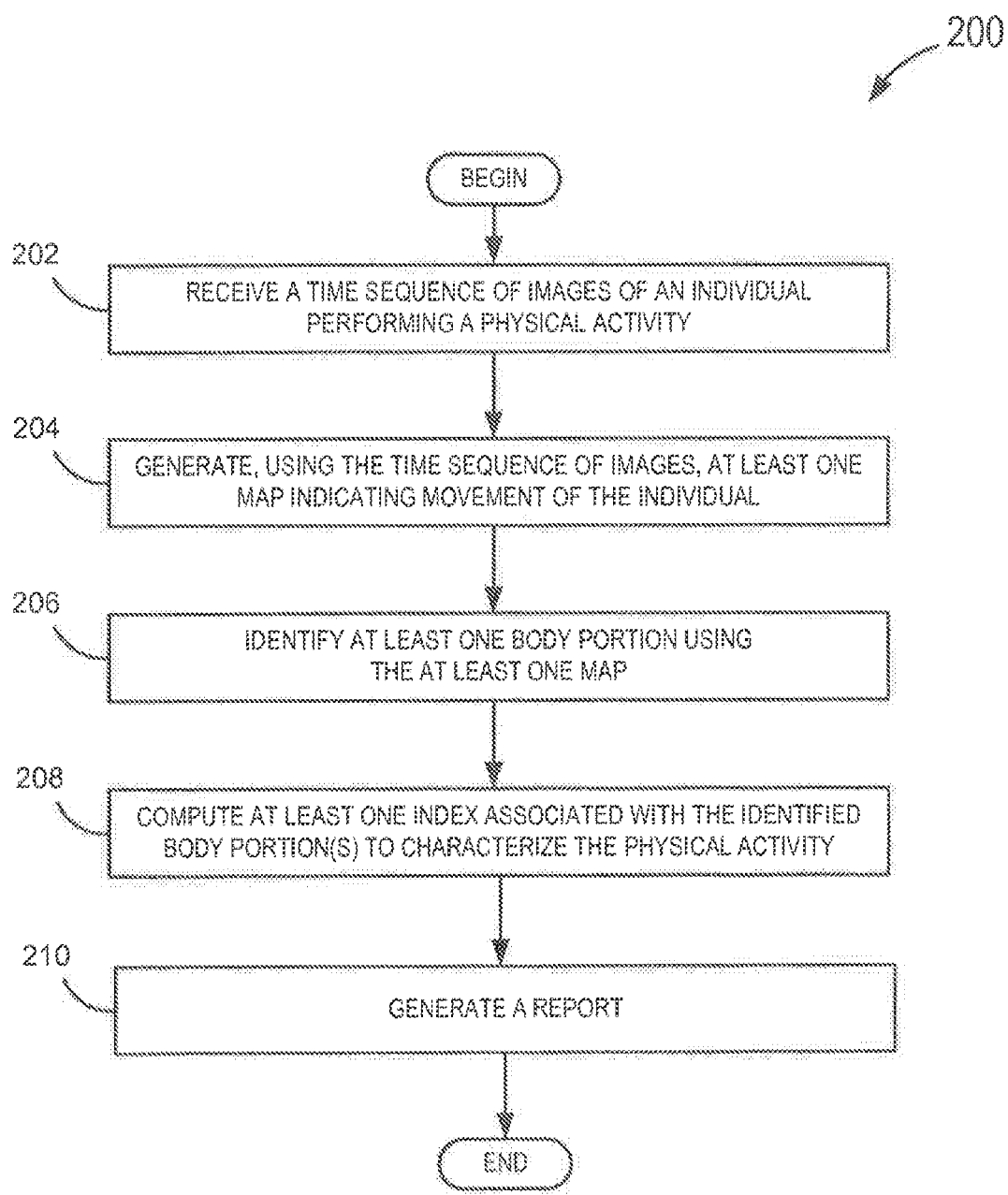
FIG. 2A is a flowchart setting forth steps of a process for characterizing physical exercise, in accordance with aspects of the present disclosure.
Figure 2B:
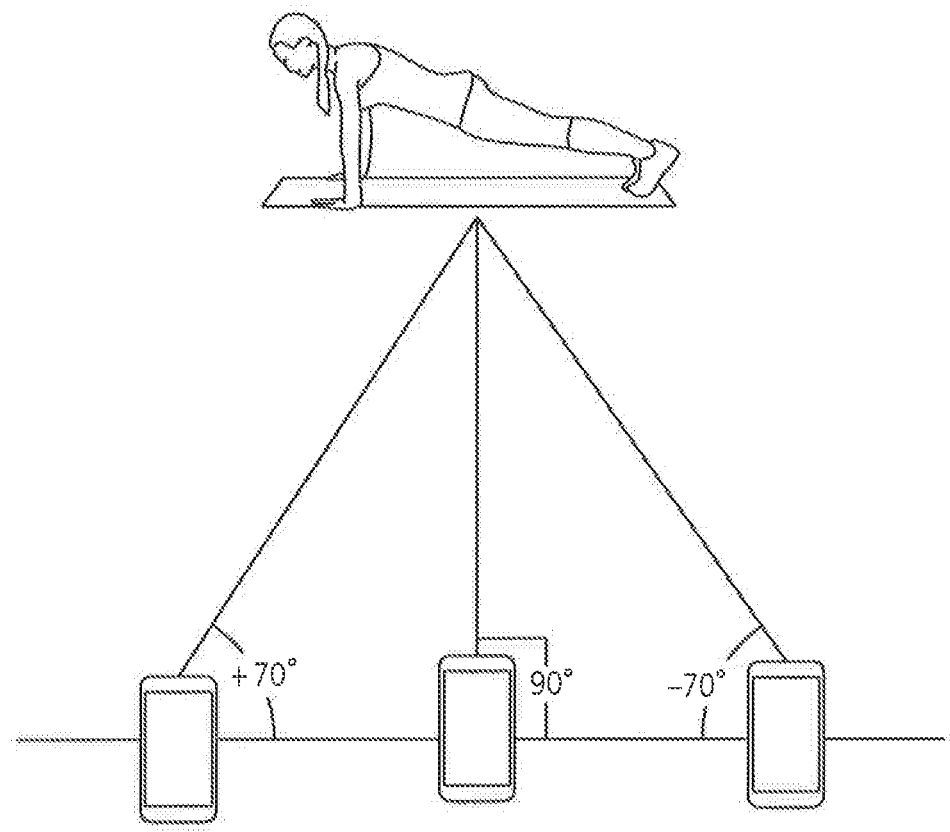
FIG. 2B is a schematic diagram illustration an example video recording implementation, in accordance with aspects of the present disclosure.

Referring now to FIG. 2A, the steps of a process 200, in accordance with aspects of the present disclosure, are shown. As indicated at process block 202, a time sequence of images associated with an individual performing a physical activity, such as an exercise routine, may be received. In some aspects, this includes operating a system or device, as described with reference to FIG. 1A-D, for acquiring such time sequence of images. In some modes of operation, a single vantage point for acquiring the image data may be selected for the system or device. In other modes of operation, multiple vantage points may be selected to capture images of the entire body of an individual from multiple points of view, as illustrated in FIG. 2B. This may be achieved either using a single device, or multiple devices. Although FIG. 2B shows use of the same smartphone device, it may be appreciated that any combination of systems and devices, in accordance with the present disclosure may be utilized. Images may be captured either using ambient illumination, or using light from the video recording device, or external light source. In some modes of operation, a video recording device placed may be placed near or behind a mirror so the individual can view himself or herself during exercise. Alternatively, the time sequence of images may be retrieved from a memory or other storage location.

Referring again to FIG. 2A, at process block 204, the time sequence of images may be processed and analyzed. In particular, at least one map indicating a movement of the individual may be generated using the time sequence of images. As described, this can include utilizing an optical flow sensing algorithm to generate various velocity field maps. Using the generated maps, one or more body parts, or portions thereof, may then be identified, as indicated at process block 206.

In some aspects, characterizing physical activity may include determining energy expenditures, such as kinetic and/or potential energies, associated with various body parts or portions thereof. This includes determining velocity amplitudes and velocity directions for the identified body portions, for instance, using generated velocity maps, as well as their respective displacements, and particularly vertical displacements. By way of example, body portions can include the head, the neck, the trunk, the upper arms, the lower arms, the hands, the upper legs, the lower legs, and the feet of the individual, or portions thereof.

In some aspects, a hierarchical kinematic algorithm may be utilized to characterize the physical activity. In particular, body motion may be analyzed with different degrees of detail, or in layers, using various identified body portions. In quantifying the exercise intensity, at least two factors may be taken into account: 1) movements of certain body parts, such as hands and arms, require far less effort than other parts, like the trunk, and 2) movement in the direction of gravity or normal to the direction of gravity requires far less effort than movement in the opposite direction of gravity. Therefore, there is a need to not only analyze the motion of the overall body, but also individual parts of the body. This requires proper identification individual body parts, and analysis of the contributions of different body parts to the total energy expenditure of the exercise, which is performed using hierarchical kinematic algorithm.

In particular, a hierarchical kinematic algorithm divides the body into different hierarchical layers, each layer having an increasing level of detail of the body parts, and the contribution of each layer to the total energy expenditure may also increase with the layer. At the crudest layer, the algorithm may track the overall body movement using the center of mass of the individual. This layer is expected to contribute to the total energy expenditure the greatest. The algorithm may then further analyze the head, trunk, legs, and arms of the body at a higher layer. Based on the need and image quality, the algorithm can also analyze each body part in terms of smaller components in an even higher layer. To take into account the importance of gravity, the algorithm can track not only velocity, but also movement of different body parts in the vertical direction. Velocity is related to kinetic energy, while vertical displacement is associated with potential energy.

Figure 3:
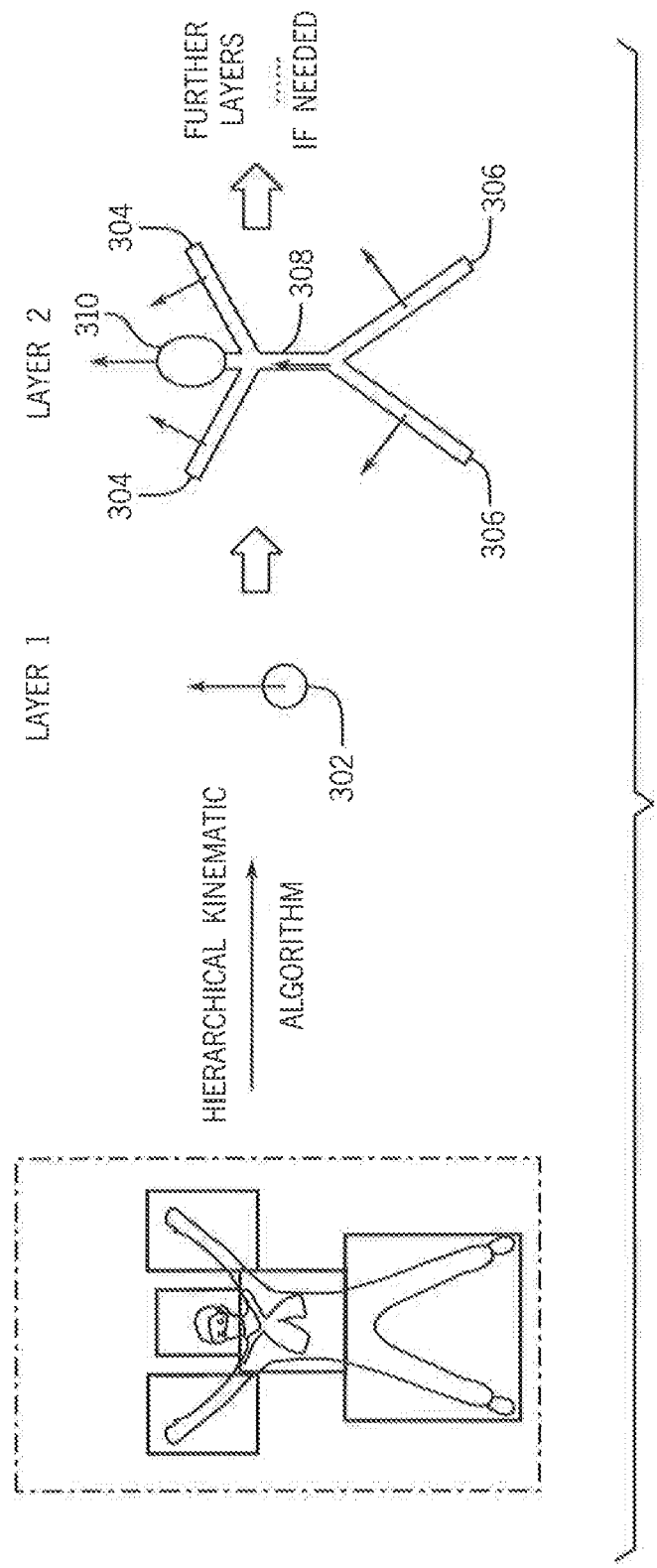
FIG. 3 shows a process for the use of a hierarchical kinematic algorithm for analyzing exercises in accordance with the present disclosure.

By way of example, FIG. 3 shows a diagram of an analyzed exercise activity using two different layers, namely Layer 1 and Layer 2. In Layer 1, the individual is represented as a single object 302. On the other hand, in Layer 2, the individual is represented using major body parts, including arms 304, legs 306, torso 308, and head 310. As may be appreciated, any number of layers may be utilized, with the desired level of detail. In addition, it is envisioned that, the number of layers or identified body portions may depend upon the particular characteristics of the individual, as well as the physical activity being performed.

Referring again to FIG. 2A, at process block 208, one or more index may be computed to characterize the physical activity of the individual, such as energy expenditure, intensity as well as the duration of the physical activity being tracked. For instance, mechanical energies associated with different body portions may be determined. In particular, for an identified body portion the average kinetic energy for each cycle of a workout is given by $$E_k = \frac{1}{N}\sum_{n=1}^{N}\left(\frac{1}{2}m(\overline{U_n}^2)\right) = m \cdot \left[\frac{1}{N}\sum_{n=1}^{N}\left(\frac{1}{2}(\overline{U_n}^2)\right)\right], \quad (1)$$

where n is the frame number, N is the total number of frames in a repetition of workout, m is the mass of the subject, and $\overline{U_n}$ is the average optical flow in frame n. In some aspects, to estimate the real velocity of body movement from the optical flow, the height of the subject may be used to calibrate the velocity field.

Similarly, the potential energy increase is expressed as $$E_p = mg\Delta h = m \cdot [g\Delta h], \quad (2)$$

where g=9.8 m/s², the free fall acceleration, Δh is the height increase. Specifically, the height increase may be determined using $$\Delta h = \sum_{n=1}^{N}(\overline{v_n^+} * t_0), \quad (3)$$

where $\overline{v_n^+}$ is the average velocity in the upward direction from the optical flow at frame n, and to is the time interval between two adjacent frames. The total mechanical energy change per cycle is the sum of the kinetic energy (Eqn. 1) and potential energy (Eqn. 2).

In the example described above, a Layer 1 approximation focusing on the center of mass of an individual would not consider the detailed movements of the body parts, which could significantly overestimate or underestimate the actual energy expenditure. For example, in the case of jumping jack, the subject could vigorously wave his/her arms without jumping much, which would affect the average body movement. This problem could be dramatically reduced using a Layer 2 analysis, taking into account the movements of major body parts. As shown in FIG. 3, the body parts could be segmented into head, arms, legs and trunk. The average kinetic and potential energies of each body part may then determined using an algorithm similar to the one described above. That is, the average kinetic and potential energies of the entire body may be computed as weighted sum of energies of the major body parts, given by:

$$E_p = \Sigma_i w_i E_p^i \quad (4)$$

$$E_k = \Sigma_i v_i E_p^i, \quad (5)$$

where $E_p^i$ is average potential energy increase during the rising portion of the workout, and $E_k^i$ is the average kinetic energy of the workout for each identified body portion. The coefficients $v_i$ and $w_i$ are the weighting factors that may be chosen to be the relative mass of the different body portions. For example, $$E_{p,k} = 0.0681 E_{p,k}^{head} = 0.0943 E_{p,k}^{arms} + 0.4074 E_{p,k}^{legs} = 0.4302 E_{p,k}^{torso} \qquad (6)$$

It is anticipated, however, that the relative weight factors could also depend on other factors, such as the gender and possibly the type of physical activity being performed. Hence more complex equations, taking into account such factors, may be used.

Computed energies, as described above, may then be utilized at process block 208 to quantify an energy expenditure or intensity associated with the physical activity being performed. This may include making a comparison to database listing energy expenditures or intensities of different physical activities or calibration curves. In some aspects, personal information obtained from the individual may be utilized in characterizing the physical activity. For instance, information associated with a personal profile may include a resting or baseline energy expenditure or intensity, or other baseline quantity, as well as gender, total weight, relative weights of different body portions, body surface area, and so forth. In some aspects, an intensity, such as a low, a medium, or a high intensity designation for the analyzed physical activity, may be determined using measured energy expenditure and reference data.

In addition, a number of repetitions of the physical activity may also be counted, for instance, by tracking a boundary associated with the at least one body portion of the individual. For instance, a repetition count may be determined based on an amplitude analysis of an optical flow field or a template matching of an oriented histogram of the optical flow field. In addition, a duration of a physical activity, or physical activity cycle may also be determined.

As appreciated form the above, a variety of computed indices, or quantities derived therefrom, in a variety of layers, according to requisite detail, or type of physical activity, may be computed at process block 208 to characterize the physical activity of the subject. For example, a metabolic equivalent of task ("MET") quantity may be computed using computed energies. In addition, in some aspects, such indices, or quantities, as well as other inputted information, as described, may be utilized to identify a type of physical activity being performed.

Then, at process block 210, a report of any form may be generated using the computed indices. For instance, the report may include information associated with intensity, energy expenditure, activity duration, repetition count, a calorie count, a metabolic index, and so forth, for a selected or identified physical activity. In some aspects, the report may also include information associated with a fitness goal progress or a health condition, as well as instructions to a user regarding the particular physical activity. For example, in analyzing a particular physical activity, the report may provide information associated with a correctness of execution or an efficiency in energy use. In some implementations, the report may be in the form of graphs, color maps, images, and so forth.

Figure 4:
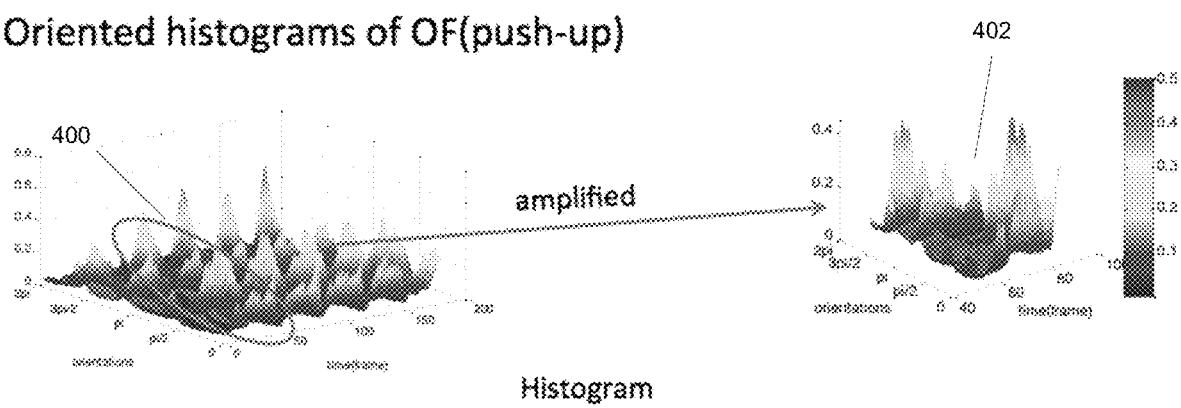
FIG. 4 shows an oriented histogram of a push-up in accordance with the present disclosure.
Figure 4:
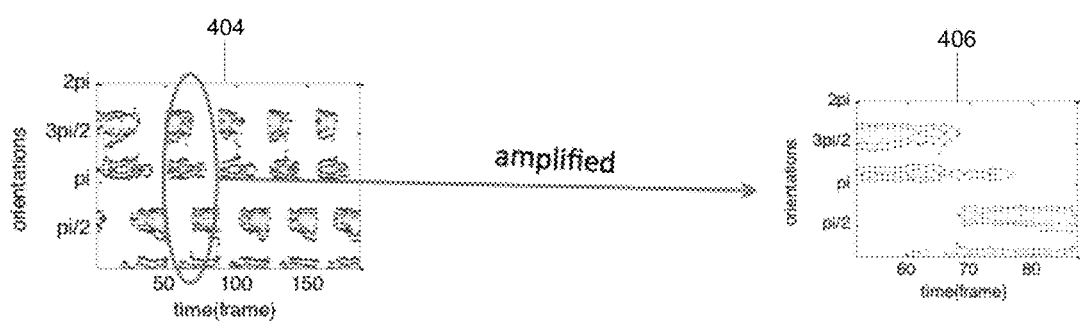

Referring now to FIG. 4, an oriented histogram 400 of a push-up is shown. One of the methods for correct identification of exercises is based on a method for oriented histogram of optical flow and on the Hidden Markov Model. The oriented histogram 400 plots the amplitude of the optical velocity field for 5 cycles. The oriented histogram 400 may be amplified to zoom in on one push-up cycle 402. A contour plot 404 may also be made of the oriented histogram. The contour plot 404 may be amplified to zoom in on one push-up cycle 406.

Figure 5:
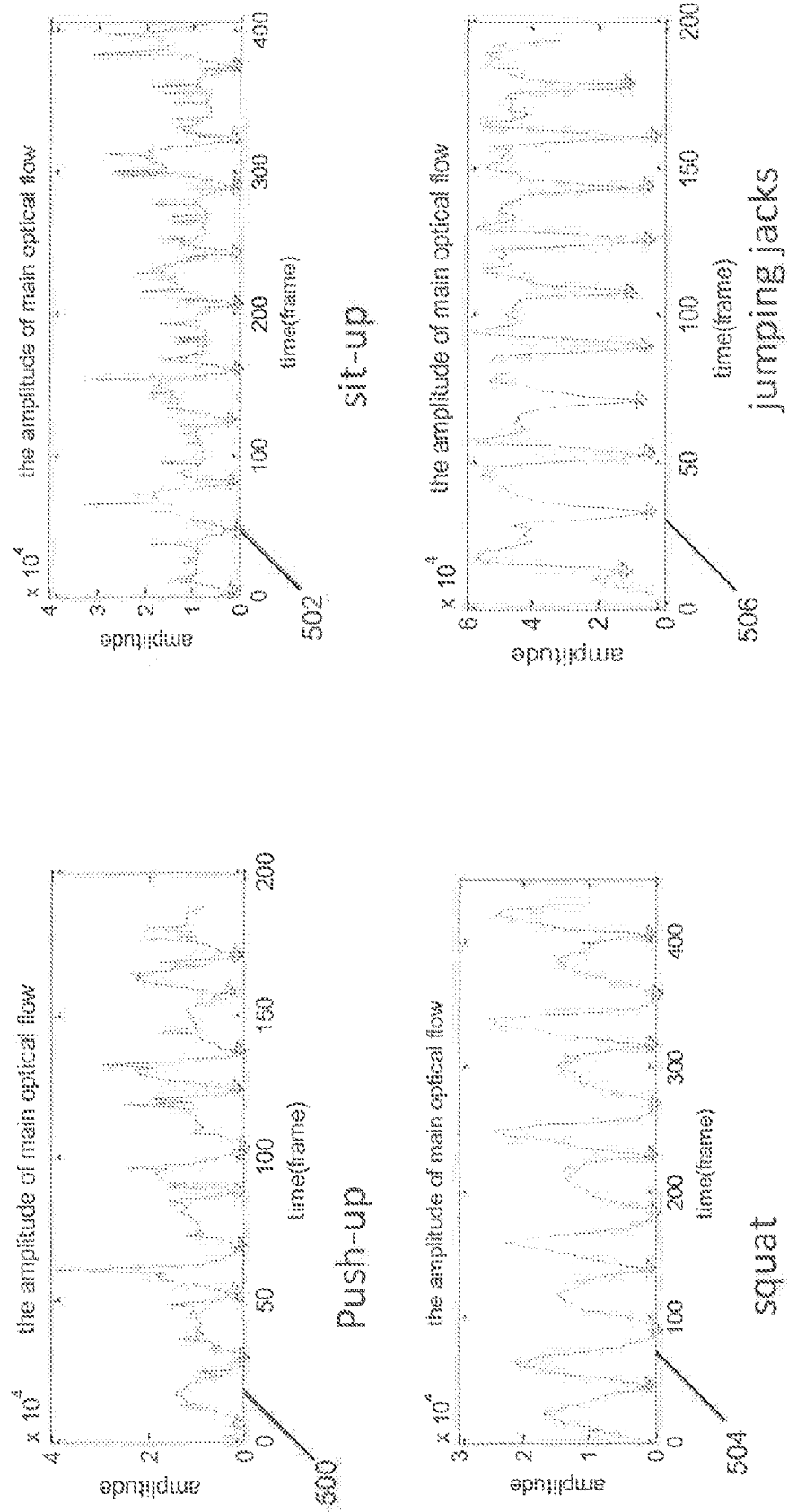
FIG. 5 shows charts of the amplitude of main optical flow over time for various exercises in accordance with the present disclosure.

Three methods for counting the repetitions of various exercises will now be disclosed. Although only three methods are presented, other methods may also be used. The first method is based on an amplitude analysis of an optical flow field. Referring now to FIG. 5, charts of the amplitude of main optical flow over time for push-ups 500, sit-ups 502, squats 504, and jumping jacks 506 are shown. Referring again to FIG. 3, for simplicity, Layer 1 may be used to count the repetitions of the exercise because it considers the overall body movement at each moment. In some aspects involving a periodic exercise, one cycle of the exercise can be segmented into two phases according to the main moving direction of the subject's body, rising phase, and declining phase (or back phase and forth phase). When transferring from one phase to the other, the body's velocity will change its direction, and the magnitude of main optical flow will reach a minimum. Therefore, the minima of main optical magnitude to segment the half cycles of the exercise can be detected. Consequently, the number of cycles of the exercise can be calculated.

Figure 6:
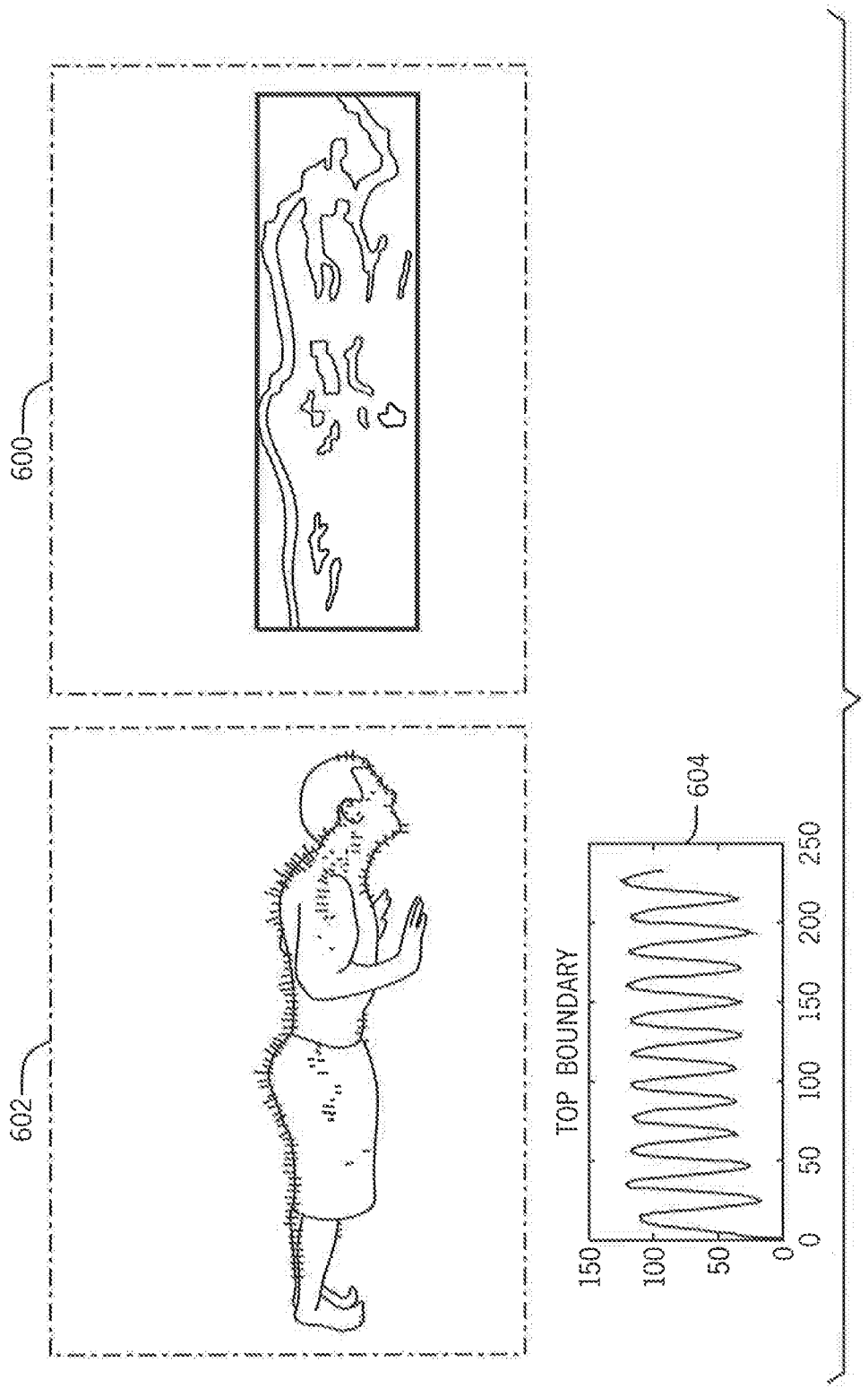
FIG. 6 is a graphical illustration showing the determination of repetition count of an exercise using the boundary of an individual in accordance with the present disclosure.

The second counting method is based on determining the boundary of the individual doing the exercise. Referring to FIG. 6, determining the repetition count of an exercise using the boundary 600 of an individual 602 is shown. The corresponding position change of the boundary is plotted as a function of time as shown in the chart 604. The chart 604 shows periodic or quasi-periodic variations from the exercise repetition, and those variations are counted.

Figure 7:
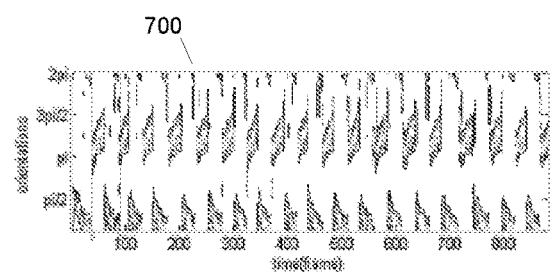
FIG. 7 shows counting the repetitions of an exercise using template matching in accordance with the present disclosure.
Figure 7:
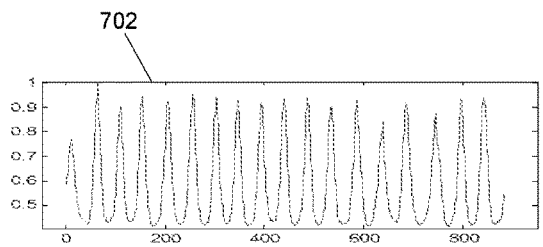

The third counting method is based on a template matching method. Referring now to FIG. 7, counting the repetition count of an exercise using template matching is shown. A contour map 700 of a histogram may be transformed into a plot 702 of the sum of the squared difference ("SSD"). The SSD sign may be reversed and normalized to the range [0, 1], for example. Time duration of the exercise may be determined from the time stamps of the videos.

Generally, the difference in the oriented histograms due to the effort or exercise intensity is subtle to detect. One approach for finding the difference includes comparing the amplitude of the optical flow field, which reflects how fast the individual moves or the kinetic energy part of the energy expenditure. However, this analysis does not count the potential energy part of the energy expenditure or the work involved to move the body up against gravity. The potential energy is reflected in the y-component of the velocity field obtained with the optical flow method. This is because the time integral of the y-component of the velocity is proportional to the height change of the body to body parts.

Figure 8:
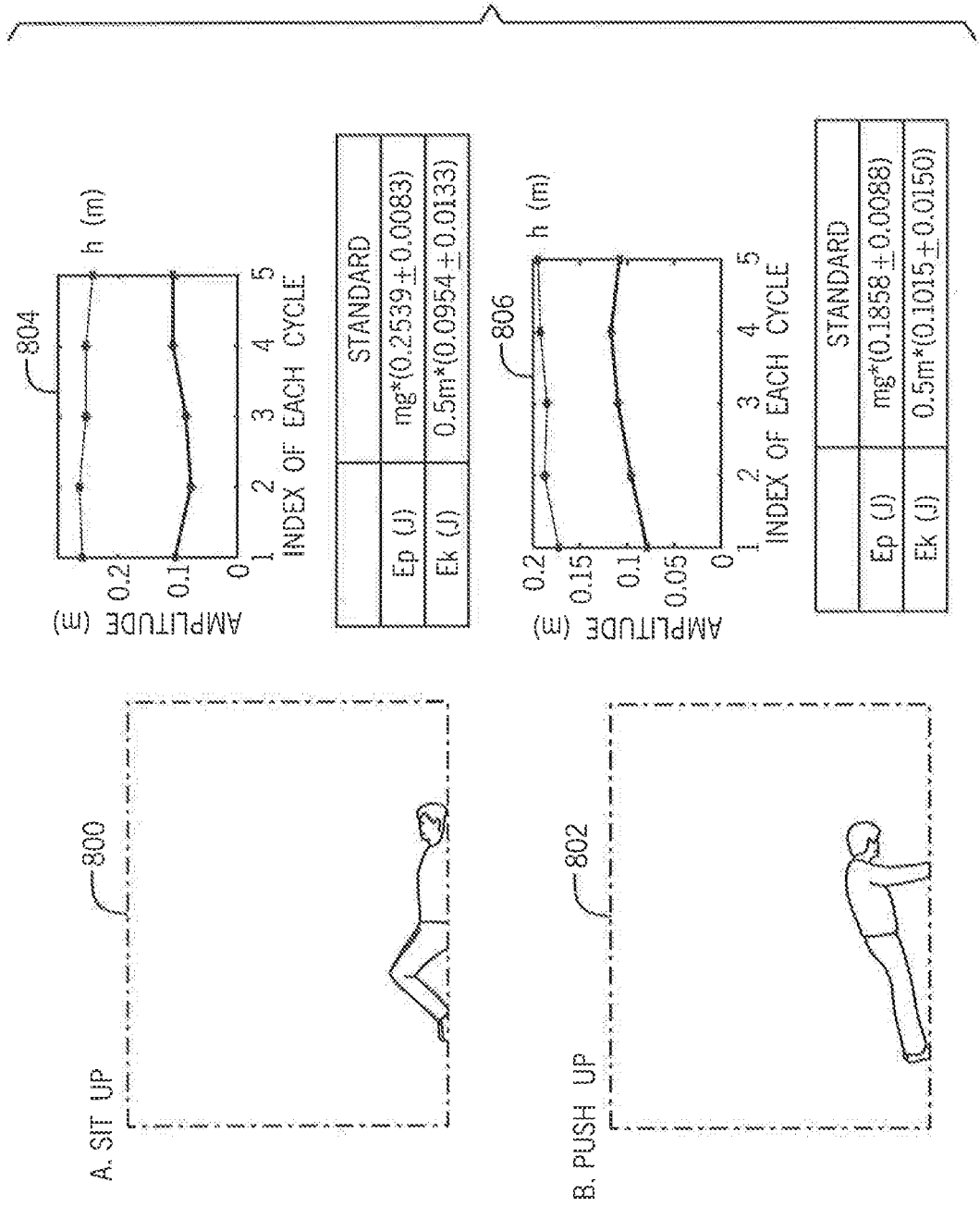
FIG. 8 shows vertical displacement and velocity square averaged over each repetitive cycle for a sit-up and a push-up in accordance with the present disclosure.

Referring now to FIG. 8, vertical displacement and velocity square averaged over each repetitive cycle for a sit-up 800 and a push-up 802 are shown. After analyzing the body using a hierarchical algorithm, determining the velocity field of different body portions associated with different layers, and counting the repetitions, the physical activity intensity of a kinematic model is quantified. Important parameters to be determined include the vertical displacement and velocity square shown in the charts 804, 806 for a sit-up and a push-up. The vertical displacement is related to the potential energy, efforts consumed to overcome gravity, and the velocity square is related to the kinetic energy. Using Layer 1, as described, the overall body velocity square averaged over a repetitive period can be readily determined from the optical flow method. For the vertical displacement, the overall velocity in the vertical direction over time (sum over different image frames) is integrated. Because a movement in the direction is not expected to assume much energy, e.g., relaxing back to the flat position in the case sit up routine, the displacement in the opposite direction of gravity only is determined. At a higher layer, the velocity square and vertical displacement of each body part will be determined, and the physical activity intensity is determined from the velocity square and vertical displacement of each body part.

Figure 9:
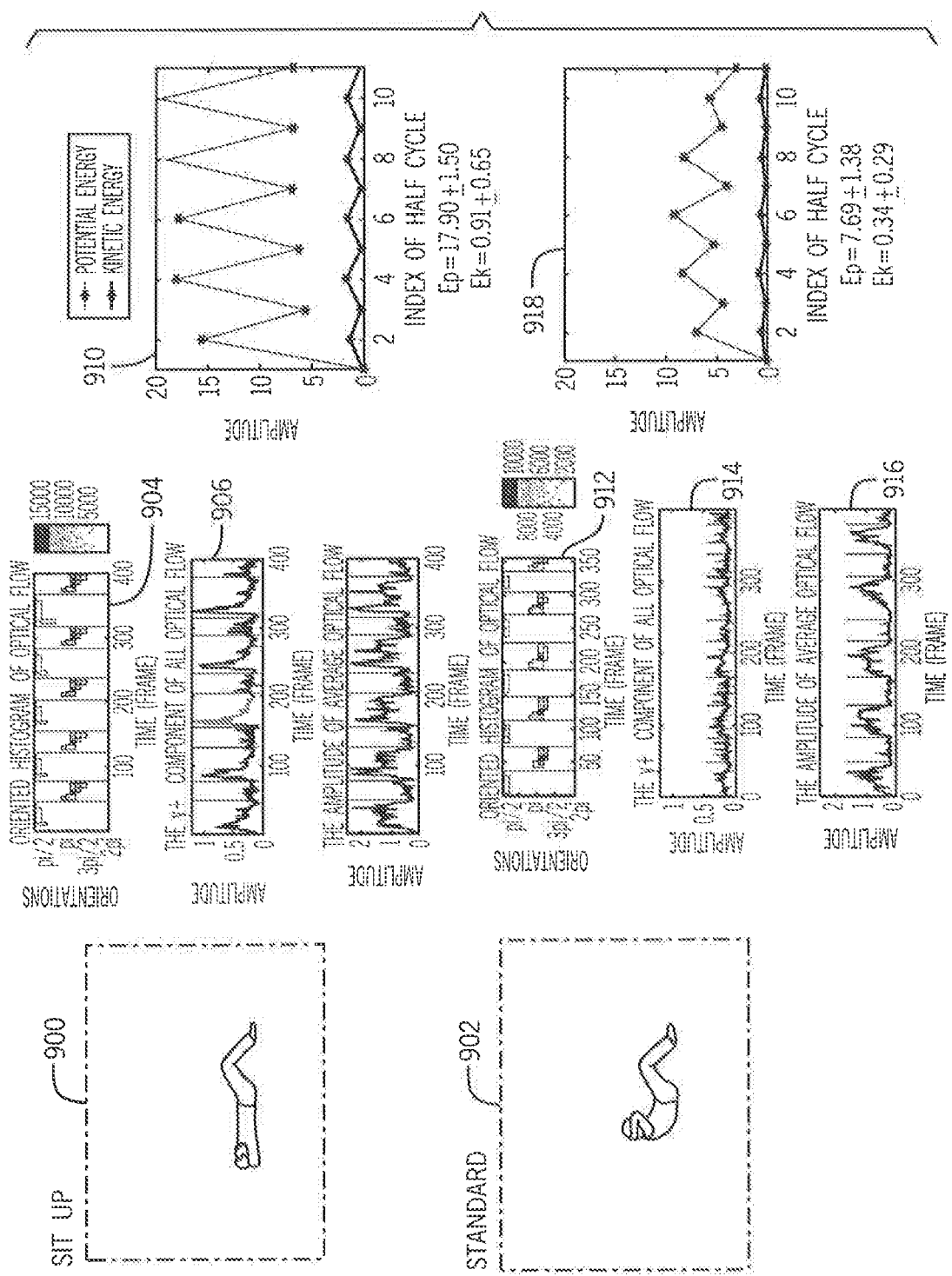
FIG. 9 shows kinetic and potential energy analyses of a sit-up in accordance with the present disclosure.

Referring now to FIG. 9, the kinetic and potential energy analyses of a standard sit-up 900 and a non-standard sit-up 902 are shown. In a standard sit-up, the body lies flat on the floor and sits up in the vertical direction. In contrast, in a non-standard sit-up, the body does not relax back to the floor and does not reach the vertical direction during the sit-up motion. The charts shown include the oriented histogram of optical flow 904, 912; the y-component of all optical flow over time 906, 914; the amplitude of the average optical flow over time 908, 916; and the potential and kinetic energy over the index of half a cycle 910, 918. The potential and kinetic energy terms in the standard case are 17.9 and 0.91 respectively. The potential and kinetic energy terms in the non-standard case are 7.69 and 0.34 respectively. As may be appreciated from the example shown, such measures and comparisons can be utilized to determine an efficiency or correctness of execution of a physical activity.

Figure 10:
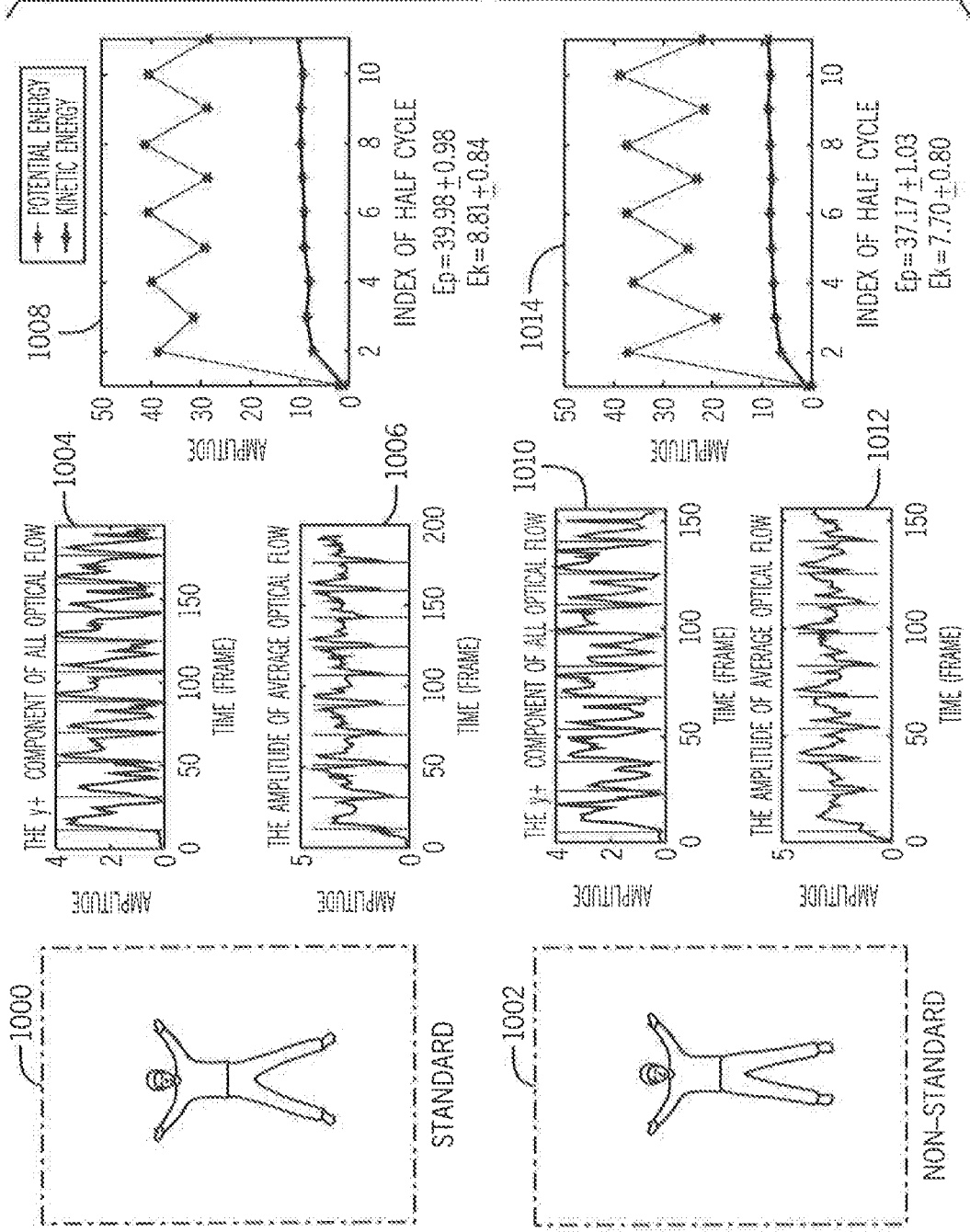
FIG. 10 shows kinetic and potential energy analyses of a jumping jack in accordance with the present disclosure.

Referring now to FIG. 10, the kinetic and potential energy analyses of a standard jumping jack 1000 and a non-standard jumping jack 1002 are shown. A non-standard jumping jack is a jumping jack where only the arms move and not the legs. The analyses include the y-component of all optical flow over time 1004, 1010; the amplitude of average optical flow over time 1006, 1012; and the potential and kinetic energy over the index of half a cycle 1008, 1014. The approach described above works well for sit-ups, push-ups and squats, but would have difficulty with exercises, such as jumping jacks. This may be appreciated from the minimal difference in results between the potential and kinetic energy for the standard and non-standard jumping jacks 1000, 1002. The potential and kinetic energy terms in the standard case are 39.98 and 8.81 respectively. Similarly, the potential and kinetic energy terms in the non-standard case are 37.17 and 7.70 respectively, which are only slightly smaller than those of the standard jumping jacks. As such, the potential and kinetic energy contributions from different parts of the body may indeed need to be considered separately from the optical flow field and counted with different weighting factors.

One approach to solving the problem associated with certain physical activities, such as jumping jacks, may be to consider different contributions of different body parts, as described, using the weight percentages of different body parts as the weighting factors. Referring particularly to FIG. 11, a weighted kinetic and potential energy analysis 1100 of a standard jumping jack 1102 vs. a non-standard jumping jack 1104 is shown. Both the potential and kinetic energy terms show much larger differences between standard and non-standard jumping jacks when compared to the unweighted potential and kinetic energy analysis shown in FIG. 10. This is because of a large difference in the movement of the trunk part of the body between the standard and non-standard jumping jacks.

The weighted potential-kinetic energy analysis can accurately analyze the effort or intensity of an exercise routine. Together with the counting of repetition and duration, the analysis can provide an estimate of energy expenditure during the exercise. However, to convert the weighted potential and kinetic energies into energy expenditure, calibration might be needed. It is envisioned that one way to obtain such calibration would be to correlate the potential and kinetic energies obtained from the image processing, in accordance with the present disclosure, with the energy expenditure obtained with another apparatus, such as one that measures produced carbon dioxide and consumed oxygen, known as indirect calorimetry. This calibration may vary from individual to individual, which can be taken into account using either the individual's gender and body weight (or body surface area) or resting energy expenditure as normalization factors. In this way, once the individual enters his or her personal profile and the type of exercise is identified, the energy expenditure can be determined based on the video using the weighted potential-kinetic energy analysis algorithm.

The present invention has been described in terms of one or more embodiments, including preferred embodiments, and it should be appreciated that many equivalents, alternatives, variations, and modifications, aside from those expressly stated, are possible and within the scope of the invention.

As used in the claims, the phrase "at least one of A, B, and C" means at least one of A, at least one of B, and/or at least one of C, or any one of A, B, or C, or a combination of A, B, or C. A, B, and C are elements of a list, and A, B, and C may be anything contained in the Specification.

The invention claimed is:

1. A system for analyzing a physical activity of an individual without contacting the individual, the system comprising:
   an apparatus configured to capture a time sequence of images of an individual performing a physical activity; and
   a processor configured to:
      receive the captured time sequence of images;
      generate, using the captured time sequence of images, at least one map having one or more velocity fields indicating movement of the individual;
      identify at least one body portion of the individual using the at least one map;
      compute at least one index associated with the at least one identified body portion to characterize the performance of the physical activity;
      generate a report using the at least one index.

2. The system of claim 1, wherein the processor is further configured to utilize an optical flow sensing algorithm to generate the at least one map.

3. The system of claim 1, wherein the processor is further configured to determine at least one of a velocity amplitude and a velocity direction for the at least one body portion using the at least one map.

4. The system of claim 1, wherein the processor is further configured to determine a displacement of the at least one body portion.

5. The system of claim 1, wherein the at least one index includes at least one of an energy expenditure and an intensity.

6. The system of claim 1, wherein the processor is further configured to compute the energy expenditure of the physical activity using a weighted sum of a vertical displacement and a velocity amplitude square of at least one body portion averaged over a duration of the physical activity.

7. The system of claim 1, wherein the processor is further configured to determine the at least one index using a hierarchical algorithm.

8. The system of claim 1, wherein the at least one body portion includes at least one of a head of the individual, a neck of the individual, a trunk of the individual, upper arms of the individual, lower arms of the individual, hands of the individual, upper legs of the individual, lower legs of the individual, and feet of the individual.

9. The system of claim 1, wherein the processor is further configured to count repetitions of the physical activity by tracking a boundary associated with the at least one body portion of the individual.

10. The system of claim 1, wherein the processor is further configured to count repetitions of the physical activity based on an amplitude analysis of an optical flow field.

11. The system of claim 1, wherein the processor is further configured to count repetitions of the physical activity based on a template matching of an oriented histogram of an optical flow field.

12. A method for analyzing physical activity performed by an individual comprising:
    a) receiving a time sequence of images captured while with an individual is performing the physical activity;
    b) generating, using the captured time sequence of images, at least one map having one or more velocity fields indicating a movement of the individual;
    c) identifying at least one body portion using the at least one map;
    d) computing at least one index associated with the identified body portions to characterize the physical activity of the individual; and
    e) generating a report using the at least one index.

13. The method of claim 12, wherein the method further comprises utilizing an optical flow sensing algorithm to generate the at least one map.

14. The method of claim 12, wherein the method further comprises determining at least one of a velocity amplitude and a velocity direction for the at least one body portion using the at least one map.

15. The method of claim 12, wherein the method further comprises determining a displacement of the at least one body portion.

16. The method of claim 12, wherein the at least one index includes at least one of an energy expenditure and an intensity.

17. The method of claim 12, the wherein the method further comprises computing the energy expenditure of the physical activity using a weighted sum of a vertical displacement and a velocity amplitude square of at least one body portion averaged over a duration of the physical activity.

18. The method of claim 12, wherein the method further comprises determining the at least one index using a hierarchical algorithm.

19. The method of claim 12, wherein the at least one body portion includes at least one of a head of the individual, a neck of the individual, a trunk of the individual, upper arms of the individual, lower arms of the individual, hands of the individual, upper legs of the individual, lower legs of the individual, and feet of the individual.

20. The method of claim 12, wherein the method further comprises counting repetitions of the physical activity by tracking a boundary associated with the at least one body portion of the individual.

21. The method of claim 20, wherein the method further comprises counting repetitions of the physical activity based one of an amplitude analysis of an optical flow field or a template matching of an oriented histogram of the optical flow field.

22. The method of claim 12, wherein the method further comprises quantifying an energy expenditure of the individual using at least one of a calibration curve and a personal profile of the individual.

23. The method of claim 22, wherein the personal profile of the individual includes at least one of a resting energy expenditure of the individual, a gender of the individual, a weight of the individual, relative weights of different body portions of the individual, and a body surface area of the individual.

* * * * *